Jan. 24, 1933. H. J. WOODALL ET AL Re. 18,720

AUTOMOBILE CLOSED BODY CONSTRUCTION

Original Filed Aug. 2, 1926

INVENTORS
HERBERT J. WOODALL
MEREDITH S. RANDALL
BY
Parker & Paterson
ATTORNEYS.

Reissued Jan. 24, 1933

Re. 18,720

UNITED STATES PATENT OFFICE

HERBERT J. WOODALL AND MEREDITH S. RANDALL, OF DETROIT, MICHIGAN, ASSIGNORS TO WOODALL INDUSTRIES INCORPORATED, OF DETROIT, MICHIGAN, A CORPORATION OF MICHIGAN

AUTOMOBILE CLOSED BODY CONSTRUCTION

Original No. 1,740,489, dated December 24, 1929, Serial No. 126,588, filed August 2, 1926. Application for reissue filed May 5, 1930. Serial No. 449,994.

Our invention relates to an improved wall panel assembly particularly designed for use in connection with the interior panels of closed automobile bodies.

The improved panel is so formed and constructed as to be readily fastened into place upon a provided frame and is of such a character that, when the panel is in place, the fastening means are concealed and protected and the covering material with which the panel is provided has its edges concealed and protected.

Panels of this character are commonly formed of cardboard covered with suitable upholstery material extending over one surface thereof and our invention is shown as embodied in a panel of this type. The panel is provided with apertures opening on the uncovered side of the panel which are adapted to receive suitable fasteners to secure the panel to the frame which supports the same.

Various advantages and meritorious features of construction will more fully appear from the following specifications, appended claims, and accompanying drawing, in which:

Figure 1:
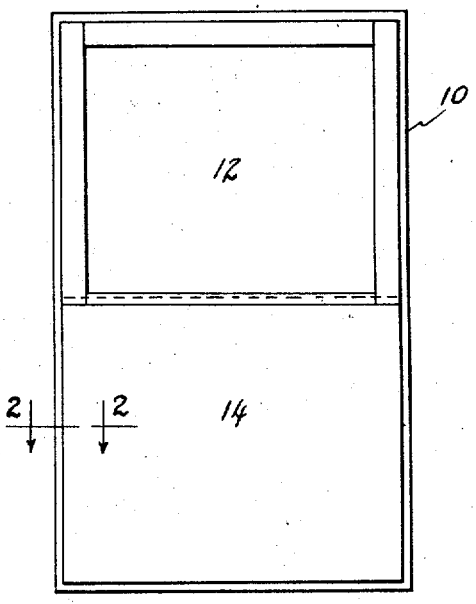
Fig. 1 is an interior elevation of an automobile door of conventional design provided with our improved panel construction.

For purposes of illustration we have shown our invention as embodied in a door panel assembly of the character employed in closed automobile bodies. The door is indicated in assembly as 10. It has a window opening 12 and our improved panel 14 positioned below such opening. A common type of door construction is to employ a metal structure having an outer wall 16 bent as at 18, 20, 22, 24 and 26, into the frame shown in Figs. 2 and 4.

Our improved panel is preferably formed of cardboard covered upon one side with suitable upholstery material 28 which is secured thereto along the margin of the panel by being glued or otherwise fastened in place. The marginal portion of the panel to which the covering material is secured is folded over as at 30 and is here shown as stitched in place as at 32, thereby concealing and protecting the edge of the covering material and its point of attachment to the panel. In the construction shown in Figs. 2 and 4, the marginal portions of the panel indicated have been folded over before the covering material was fastened down. The construction of the panel as a separate article of commerce in various forms is illustrated more fully in a copending application this date filed.

This particular application relates to the securing of the panel in place upon its supporting frame. We provide a plurality of fasteners here shown in the form of stud bolts 34 carried by the portion 22 of the frame and secured thereon by a nut 36. Heads 38 are provided upon the opposite and outer ends of these bolts 34.

The marginal portion of the panel is provided with a plurality of spaced apart keyhole openings 40 each having an enlarged end portion adapted to be received over the head 38 of one of the bolts 34 and each having a reduced end portion communicating with the enlarged end portion and adapted to receive the shank of a bolt and to engage the head of the bolt when engaged therewith to hold the panel in place.

Figure 4:
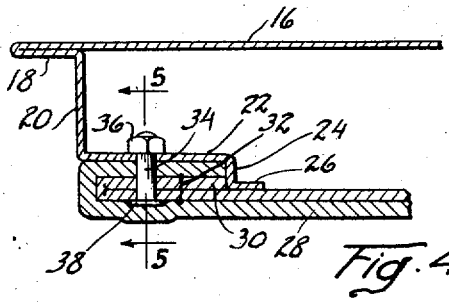
Fig. 4 is a cross-sectional view taken on the same line as Fig. 2 showing a modified form of construction.
Figure 5:
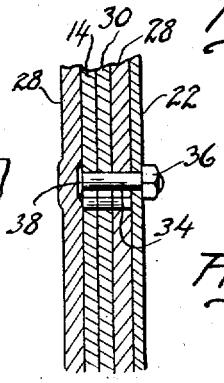
Fig. 5 is a cross-sectional view taken on line 5—5 of Fig. 4.
Figure 6:
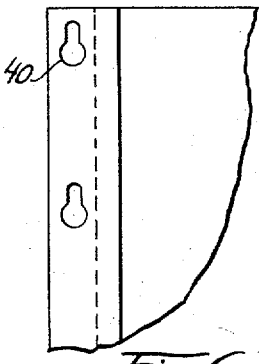
Fig. 6 is an elevation of a fragment of one form of our panel structure.

In Figs. 4, 5, and 6, we have shown these keyhole openings as extending entirely through the cardboard panel structure. The bolts are provided with relatively thin heads which are concealed by the covering material of the panel and are readily receivable through the enlarged end portion of the keyhole opening.

Figure 2:
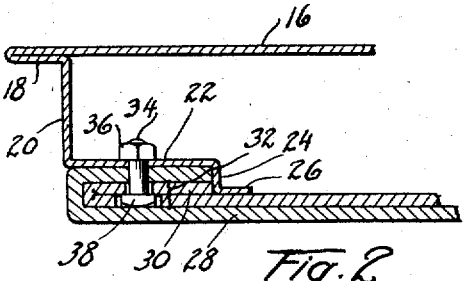
Fig. 2 is a cross-sectional view taken on line 2—2 of Fig. 1.
Figure 3:
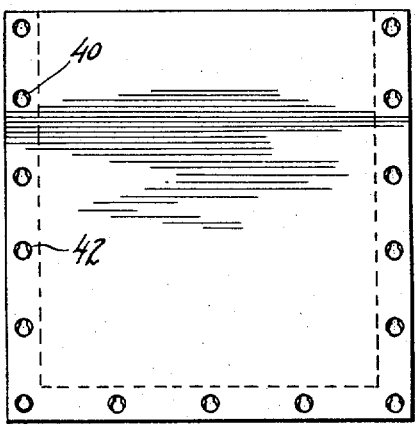
Fig. 3 is an elevation of the panel.
Figure 7:
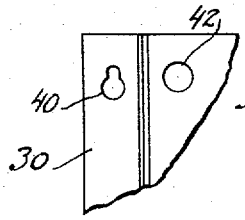
Fig. 7 is an elevation of a fragment of a modified form of our panel structure.

In Figs. 2, 3, and 7, we have shown the keyhole openings as extending through the marginal portion 30 of the panel but not through the outer adjacent portion of the panel. This construction is particularly illustrated in Fig. 7 wherein keyhole opening 40 is shown as located in the marginal portion 30 and the outer portion of the panel proper is shown as provided with an opening 42 disposed opposite the reduced end of the keyhole opening, which opening 42 is of sufficient size to receive the head of the fastener as shown in Fig. 2. In this construction the head of the fastener is seated below the outer surface of the cardboard panel and its location is not visible through the covering material.

It will be apparent, particularly from Figure 7 that the opening 42 is oversize the enlarged end of the keyhole opening 40 and therefore the head of the fastener when seated in 42 permits relative movement between the fastener and panel while interconnected.

We claim:

1. In body construction, a substantially rectangular wall frame having a continuous marginal recess extending about three edges, a wall panel adapted to fit said frame having a marginal fold along three edges adapted to seat within said recess, said frame provided with a plurality of outwardly projecting headed studs located at intervals within said recess, said marginal fold of the panel provided with a plurality of keyhole apertures located at intervals corresponding to the studs of the frame and adapted at their large ends to receive therethrough the heads of the studs, said heads being adapted to engage the margins of the small ends of the apertures, said panel provided with a plurality of apertures arranged at intervals about the edges provided with the fold, said apertures so arranged that one is positioned opposite the small end of each keyhole aperture through the fold and is of a size to receive and embrace the head of the stud extending through said keyhole aperture.

2. An automobile body trim panel comprising a cardboard body folded over along a margin forming a flange on one side thereof and provided on the opposite side with covering material extending thereover, said flange provided with a fastener opening having an enlarged end portion adapted to bodily receive the head of a headed fastener therethrough from the uncovered side of the panel and having a reduced end portion communicating with the enlarged portion and adapted to receive the shank of the fastener when the head thereof is moved out of registry with the enlarged end portion and to engage said head of the fastener to secure the same to the panel, the body portion of the panel being provided, opposite the reduced end portion of the fastener opening through the flange and offset the enlarged end of said opening with an opening adapted to receive the head of the fastener to lie substantially within the thickness of said body portion when the shank of the fastener is disposed within the reduced end portion of the opening through the flange.

3. A trim panel comprising a body portion of relatively stiff material having a rear face and an outer face, and provided with a fastener receiving opening adapted to permit the bodily insertion therethrough of the head of a headed fastener from the rear face of the panel, said opening being partially closed by the outer face of the panel, said body portion provided with a recess offset said opening but communicating therewith to receive the head of the fastener therefrom, said recess being of a size to seat the head of the fastener whereby said head lies flush with the outer face of the panel, said head of the fastener being engaged with the panel while seated in said recess.

4. A trim panel having a laminated body portion provided with a fastener receiving opening through the rear face lamination adapted to permit the insertion of the head of a headed fastener therein from the rear face of the panel, said opening being partially closed on the outer face of the panel by an outer lamination, said body portion provided with a recess in an outer lamination offset from said opening but communicating therewith to receive the head of the fastener therefrom to fit in said recess and to be engaged with the body portion of the panel thus connecting the fastener thereto.

5. A trim panel having a two ply body portion, the inner ply of said body portion provided with a fastener receiving opening adapted to permit the insertion of the head of a headed fastener therethrough from the rear face of the panel, said opening being partially closed on the outer face of the panel by the outer ply, said outer ply provided with a recess offset said opening but adapted to receive the head of the fastener therethrough from said opening to seat the same therein to engage the fastener with the panel.

6. A trim panel having a body portion provided with staggered adjacent offset openings from opposite faces, the opening in the inner face adapted to receive the head of a headed fastener to be moved therefrom to the opening in the outer face to seat therein to secure the fastener to the panel.

7. A trim panel having a body portion provided with staggered adjacent offset openings from opposite faces, the opening in the inner face being generally of a keyhole shape and adapted at its large end to receive the head of a headed fastener therethrough to be moved therefrom to the opening in the outer face to seat therein with the shank of the fastener extending through the small end of the opening in the inner face to secure the fastener to the panel.

8. A trim panel formed of two plies of material, each ply provided with a fastener receiving opening therethrough, the opening through one ply being generally of a keyhole shape and the opening through the other ply corresponding in size generally with the enlarged end of the keyhole opening but being positioned opposite the small end of the keyhole opening and offset from the large end.

9. In combination, a trim panel comprising a body portion provided with covering material over its outer face and an aperture through the body portion adapted to receive the head of the headed fastener therethrough from the rear face thereof, said body portion provided with a recess in its outer face underneath the covering material and offset said aperture adapted to receive and seat the head of the headed fastener within the thickness of the body portion to connect the fastener with the panel, and a headed fastener having its head disposed within said recess and lying substantially flush with the outer face of the body portion underneath the covering material.

10. In combination, a trim panel comprising a body portion having covering material over its outer face and provided with a fastener receiving opening adapted to receive the head of a headed fastener therethrough from the rear face thereof, a support for said panel, a headed fastener carried by the support and interconnected with the panel offset said aperture and interconnected against relative accidental disconnection, said panel and fastener being releasable by relative transverse movement frictionally resisted between them and upon relative yielding lateral movement of one of them outwardly and means permitting, but limiting a relative movement less than the frictionally resisted relative transverse movement of release.

11. In combination, a trim panel, a support for the panel, a fastener connecting the panel with the support, said panel and fastener provided with interconnecting parts securing the fastener to the panel against accidental release therefrom while permitting limited relative movement of the panel with respect to the fastener, said interconnecting parts permitting while frictionally resisting complete disengagement of the fastener from the panel.

12. In combination, a trim panel, a support for the panel, a fastener connecting the panel with the support, said fastener having a head interconnected with the panel against accidental release therefrom while having free limited relative movement with respect thereto, and means on the panel permitting, while frictionally resisting, movement of complete disengagement of the fastener from the panel.

13. In combination with a trim panel, a support for the panel, a fastener connecting the panel to the support, said panel and fastener provided with interconnecting means including a head on the fastener and a recess in the panel wherein said head is seated and has relatively free but limited movement while interconnected with the panel, said fastener and panel having parts permitting, while frictionally resisting, movement of the fastener into interconnection with or disconnection from the panel.

In testimony whereof we hereunto affix our signatures.

HERBERT J. WOODALL.
MEREDITH S. RANDALL.